(12) United States Patent
Kato (10) Patent No.: US 6,428,162 B2
(45) Date of Patent: Aug. 6, 2002

(54) METHOD AND DEVICE FOR FEEDING RECORDING SHEET

(75) Inventor: Kenichi Kato, Kanagawa (JP)

(73) Assignee: Fuji Photo Film Co., Ltd., Tokyo (JP)

( * ) Notice: Subject to any disclaimer, the term of this patent is extended or adjusted under 35 U.S.C. 154(b) by 0 days.

(21) Appl. No.: 09/886,136

(22) Filed: Jun. 22, 2001

(30) Foreign Application Priority Data

Jun. 23, 2000 (JP) ..................................... 2000-188600

(51) Int. Cl.$^7$ ..................... B41J 2/01; B41J 2/385; G03G 9/08
(52) U.S. Cl. ......................... 347/104; 347/153
(58) Field of Search ........................... 347/104, 153; 399/381, 388, 397; 271/3.18

(56) References Cited

U.S. PATENT DOCUMENTS 5,488,463 A * 1/1996 Nimura et al. ............. 355/322

FOREIGN PATENT DOCUMENTS

JP 404003767 A * 1/1992 ............... 271/3.18

* cited by examiner

*Primary Examiner*—John Barlow
*Assistant Examiner*—An H. Do
(74) *Attorney, Agent, or Firm*—Sughrue Mion, PLLC

(57) ABSTRACT

A recording sheet is sequentially fed by the transfer roller pairs, first and second feeding roller pairs and a belt conveyor. The feeding speed V1 of the transfer roller pairs including variation is set to be slower than the feeding speed V2 of the feeding roller pairs. The feeding speed V3 of the belt conveyor including variation is set to be faster than that of the feeding roller pairs. When the recording sheet is transferred to the first feeding roller pair from the transfer roller pairs, one-way clutches in the transfer roller pairs are actuated, to race the transfer roller pairs at the feeding speed V2. Before the recording sheet passes the second feeding roller pair completely, the recording sheet is fed at the speed V2 with the leading end portion thereof being slipped on the belt conveyor.

16 Claims, 9 Drawing Sheets

METHOD AND DEVICE FOR FEEDING RECORDING SHEET

BACKGROUND OF THE INVENTION

1. Field of the Invention

The present invention relates to a method and device for feeding a recording sheet at a certain speed without variation in feeding speed of the recording sheet, which is occurred in transferring the recording sheet from feeding means to another one.

2. Background Arts

In a printer processor, for instance, recording light beams are projected onto a sheet-type photosensitive recording material (hereinafter referred to "recording sheet") in a main scan direction while the recording sheet is fed in a sub-scan direction perpendicular to the main scan direction, to record an image onto the recording sheet. Along a passage of the recording sheet are provided a plurality of feeding roller pairs, each of which transfers the recording sheet to the next one. The feeding roller pairs are controlled to be equal in the feeding speed.

In order to improve the image quality, it is needed to apply the recording light beams onto the recording sheet with high precision. The recording light beams can be projected in the main scan direction with high accuracy by controlling an optical system in an exposure unit. With regard to the sub-scan direction, the feeding roller pairs provided near an exposure position are designed to feed the recording sheet with high accuracy. However, other feeding roller pairs to provided at upstream and downstream positions of the exposure position are not able to feed the recording sheet with high accuracy. Under the influence of the upstream and downstream feeding roller pairs, the feeding speed of the recording sheet is changed. Thereby, density unevenness in a print picture could be occurred.

SUMMARY OF THE INVENTION

In view of the foregoing, an object of the present invention is to provide a method and device for feeding a recording sheet capable of preventing deviation in feeding speed of the recording sheet.

To achieve the above objects, a method for feeding a recording sheet includes the following steps: feeding the recording sheet at a speed V1 by use of first feeding means, transferring the recording sheet to second feeding means from the first feeding means, transferring the recording sheet to third feeding means from the second feeding means, and feeding the recording sheet at a speed V3 by use of the third feeding means. The feeding speed V2 of the second feeding means is set, to be faster than a maximum feeding speed of the first feeding means, and slower than a minimum feeding speed of the third feeding means.

In the preferred embodiment, the first feeding means includes at least one transfer roller pair including a one-way clutch. The second feeding means includes first and second feeding roller pairs arranged sequentially along a feeding passage. The first and second feeding roller pairs rotates at a same speed by a steel belt stretched therebetween. The third feeding means includes a belt conveyor to feed the exposed recording sheet toward a processor section. When the recording sheet is nipped by the first feeding roller pair, the one-way clutch is actuated to make said transfer roller pair free. Moreover, before the trailing end of the recording sheet passes the second feeding roller pair, the recording sheet is fed with the leading end portion thereof being slipped on the belt conveyor.

According to the present invention, since the recording sheet is conveyed at the same feeding speed V2 during transfer, it is possible to prevent deviation in feeding speed of the recording sheet. Thus, image quality of a print image could be improved.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
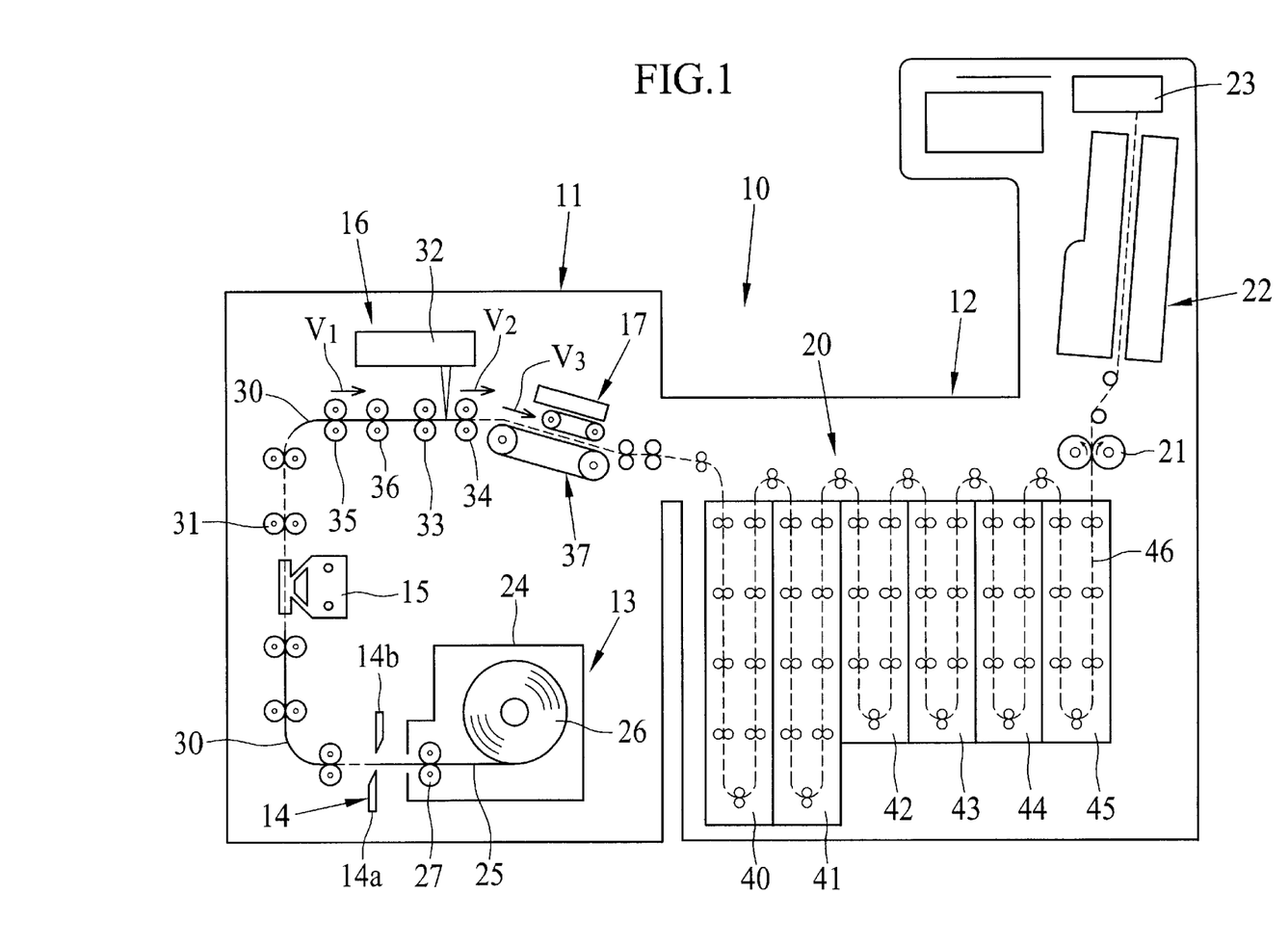
FIG. 1 is a schematic view of a printer processor having a sheet feeding device of the present invention.

In FIG. 1, a printer processor 10 is comprised of a printer section 11 and a processor section 12, which are connected to each other. The printer section 11 includes a paper loader 13, a paper cutter 14, a rear side printer 15, an exposure unit 16 and a sheet sorter 17. The processor section 12 includes a development/fixation device 20, a squeeze roller pair 21, a drier 22 and a sheet collection unit 23.

A paper magazine 24 is loaded in the paper loader 13, and includes a photosensitive recording paper 25, which is wound into a paper roll 26. For instance, the photosensitive paper 25 is formed by coating a mixture of a white pigment and a resin including a polyester, on an emulsion-coated surface (recording surface) of a base sheet. The paper magazine 24 is provided with a feeding roller pair 27, which is driven by a feeding motor (not shown). When the feeding roller set 27 rotates, the photosensitive recording paper 25 is drawn from the paper roll 26, and fed to the rear side printer 15.

The paper cutter 14 includes a fixed blade 14a and a movable blade 14b, which are positioned between the paper loader 13 and the rear side printer 15. When the photosensitive paper 15 is advanced beyond the paper cutter 14 by a predetermined length, the movable blade 14b is moved toward the fixed blade 14a to cut the photosensitive paper 25 to produce a recording sheet 30. The recording sheet 30 is conveyed along a paper guide (not shown) by a conveyor roller sets 30, and forwarded sequentially to a rear side printer 15, the exposure unit 16 and the sheet sorter 17.

The rear side printer 15 records necessary information on a rear surface (opposite surface of emulsion-coated surface) of the recording sheet 30. The exposure unit 16 has an exposure device 32 for projecting recording light beams toward an recording position, and a sheet feeding device for conveying the recording sheet 30 inside of the exposure unit 16. The sheet feeding device includes a first feeding roller pair 33 for feeding the unexposed recording sheet 30 to the exposure position, a second feeding roller pair 34 for sending the exposed recording sheet 30 to a belt conveyor 37, and transfer roller pairs 35, 36 for transferring the recording sheet 30 to the feeding roller pair 33.

The exposure device 32 includes a well-known laser printer. The exposure device 32 modulates the intensities of recording light beams on the basis of image data stored in an image memory, and projects modulated recording light beams toward the recording sheet 30 which is conveyed by the roller pairs 33 to 36. Exposed recording sheets 30 are transferred to the belt conveyor 37, arranged in plural rows by the sheet a sorter 17, and sent to the development/fixation device 20.

The development/fixation device 20 is comprised of a developing tank 40, a fixing tank 41, first to fourth washing tanks 42, 43, 44, 45, which are filled up with developing solution, fixing solution and washing solution respectively. Each of these processing tanks 40 to 45 includes a thermo sensor and heaters, and is controlled temperature of respective processing solutions to be within a predetermined range. While being conveyed inside the development/fixation device 20 along a passage 46, shown by a dotted line, the recording sheet 30 is subjected to development, fixation and washing processes.

After passing through the washing tanks 42 to 45, the recording sheet 30 is nipped by the squeeze roller pair 21. While the recording sheet 30 is conveyed by the squeeze roller pair 21, washing solution is wrung out from both surfaces of the recording sheet 30, and poured into the fourth washing tank 45.

The drier 22 includes a heater unit, a fan and so forth, and applies hot drying air to the recording surface of the recording sheet 30, which is dried completely. Afterward, the recording sheets 30 are fed to the collection device 23 to get the recording sheets 30 from the drier 22 together, sorted by a sorter (not shown), and advanced out of the printer processor 10.

Figure 2:
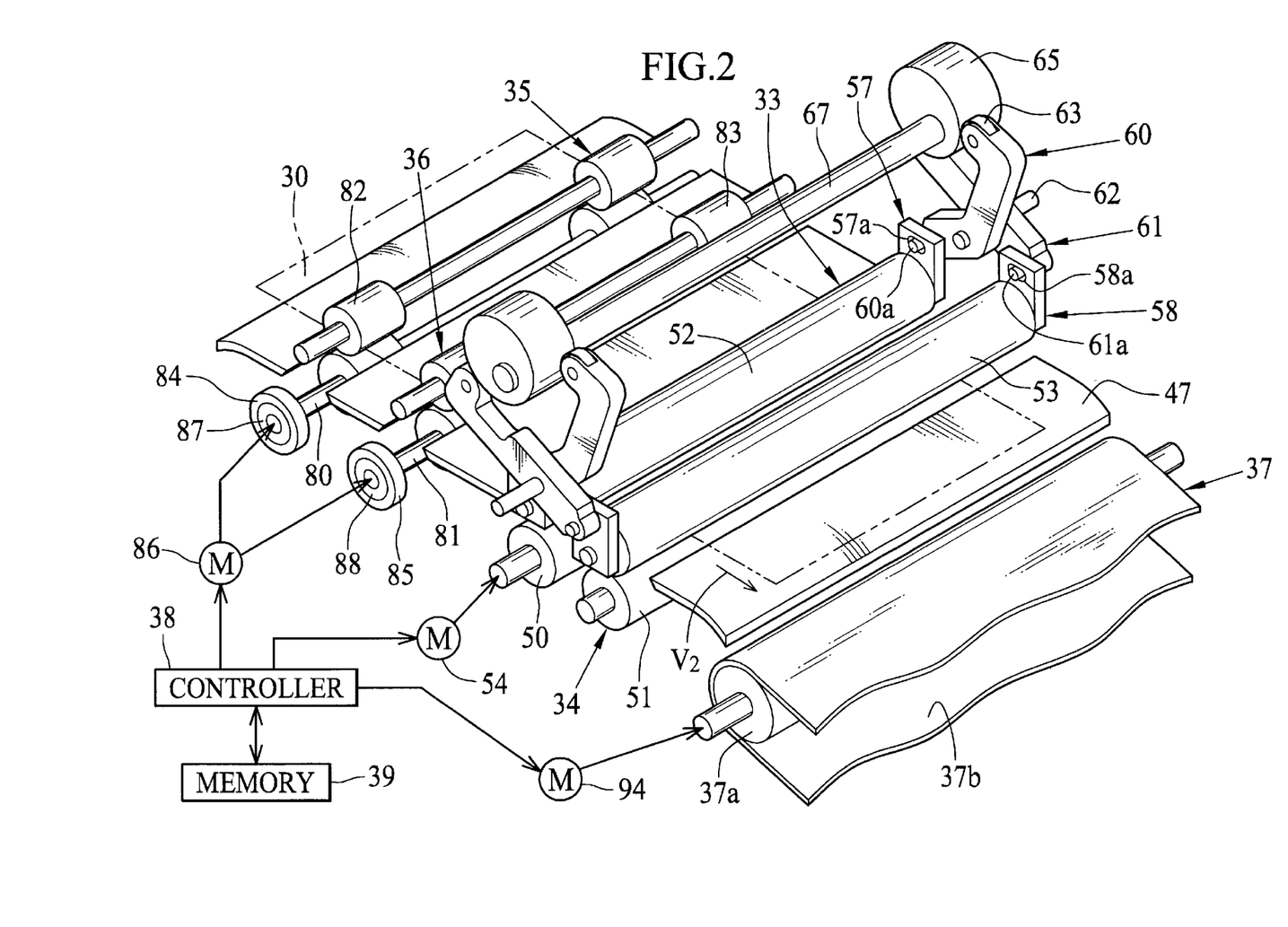
FIG. 2 is a perspective view of the sheet feeding device.
Figure 3:
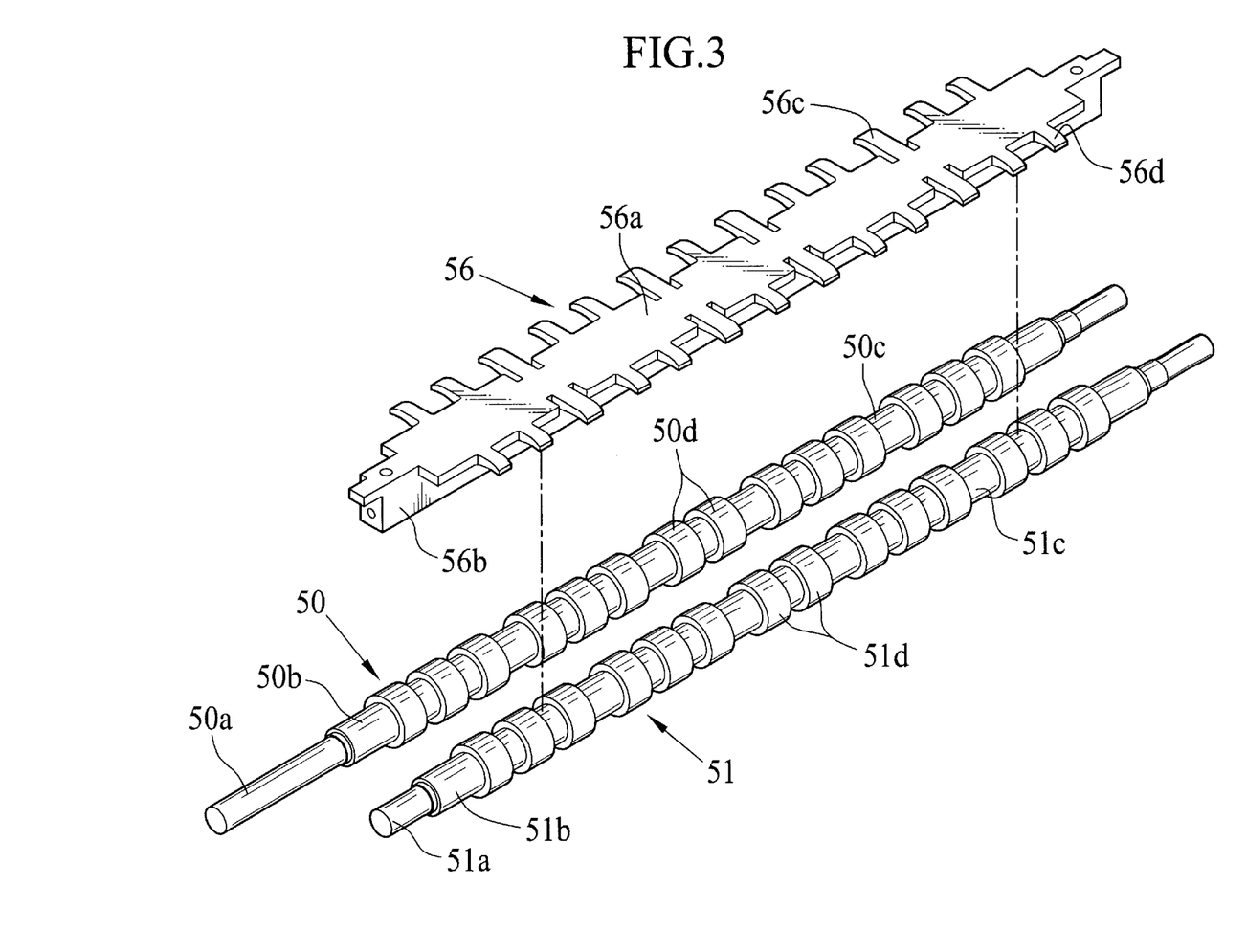
FIG. 3 is a perspective view of a capstan roller and a sheet guide.

In FIG. 2, a sheet feeding device of the present invention is depicted. The sheet feeding device includes the first and second feeding roller pairs 33, 34, the transfer roller pairs 35, 36, the belt conveyor 37, a controller 38. The first and second feeding roller pairs 33,-34 are comprised of a first feeding means of the present invention, and the transfer roller pairs 35, 36 are comprised of a second feeding means. The belt conveyor 37 is corresponded to a third feeding means. Practically, the first and second feeding roller pairs 33, 34 includes capstan and pinch rollers 50 to 53, which are divided by a plurality of orbital grooves 50c, 51c, as shown in FIG. 3. But these grooves are omitted in FIG. 2, for the purpose of simplification of the drawing.

The first feeding roller pair 33 is consisted of a capstan roller 50 and a pinch roller 52, which are located below and above a guide plate 47 respectively. The second feeding roller pair 34 is also consisted of a capstan roller 51 and a pinch roller 53, which are located below and above the guide plate 47 respectively. The capstan roller 50 of the first feeding roller pair 33 is connected to a feeding motor 54 via transmission belt (not shown). As for the feeding motor 54, a pulse motor with five-phase, one-hundred-teeth type can be used. The feeding motor 54 is controlled by a controller 38 through a motor driver (not shown). The controller 38 sends drive pluses to the feeding motor 54 so as to rotate the feeding motor at a certain speed, for instance, more than ten revolutions per second. Pulse rate information for driving the feeding motor 54 is stored in a memory 39, and is read out by the controller 38.

Figure 5:
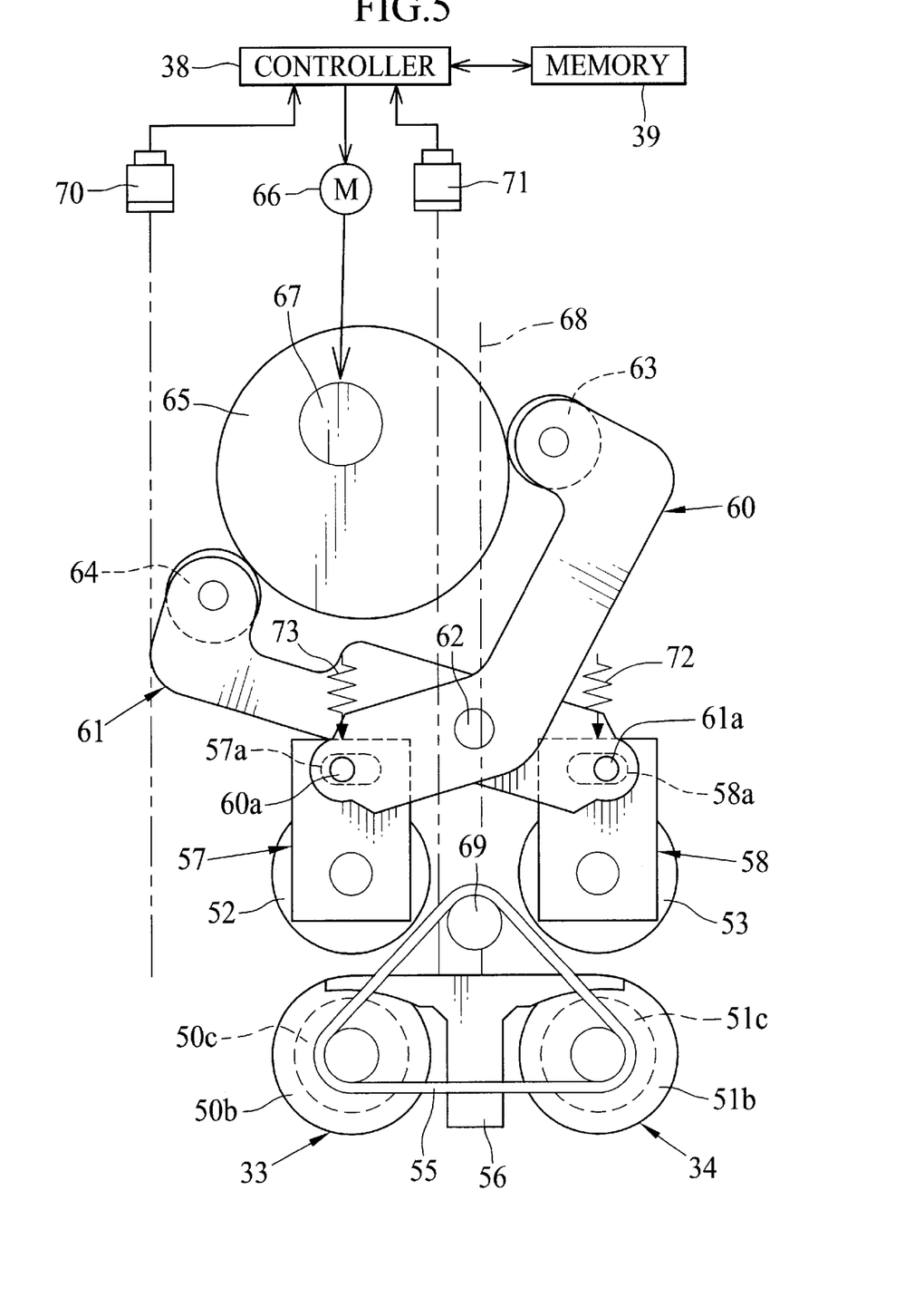
FIG. 5 is a side elevation view of the sheet feeding device in a state before feeding a recording sheet.

Between the pinch rollers 52, 53 is provided a tension pulley 69 (see FIG. 5). A steel belt with no elasticity is stretched between the capstan rollers 50, 51 and the tension pulley 69. When the single feeding motor 54 rotates, both two capstan rollers 50, 51 are rotated at a same speed with high accuracy.

The recording sheet 30 from the transfer roller pairs 35, 36 is nipped by the capstan roller 50, 51 and the pinch roller 52, 53. When the capstan rollers 50, 51 rotates, the recording sheet 30 is fed in a direction shown by an arrow (sub-scan direction) at a speed V2. In conveyance, the exposure device 32 is activated to project linear recording light beams along a main scan direction, perpendicular to the sub-scan direction, toward an exposure position 68 (see FIG. 5). Thereby, an image is recorded onto the recording sheet 30 line by line.

In FIG. 3, the capstan rollers 50, 51 has metal axial portions 50a, 51a, and silicon rubbers 50b, 51b for covering the axial portions 50a, 51a. The silicon rubbers 50b, 51b has a plurality of orbital grooves 50c, 51c along the axial direction. By the orbital grooves 50c, 51c, the outer surfaces of the capstan rollers 50, 51 are divided into plural roller bodies 50d, 51d, to reduce deformation of the recording sheet in the widthwise direction (main scan direction).

Figure 4:
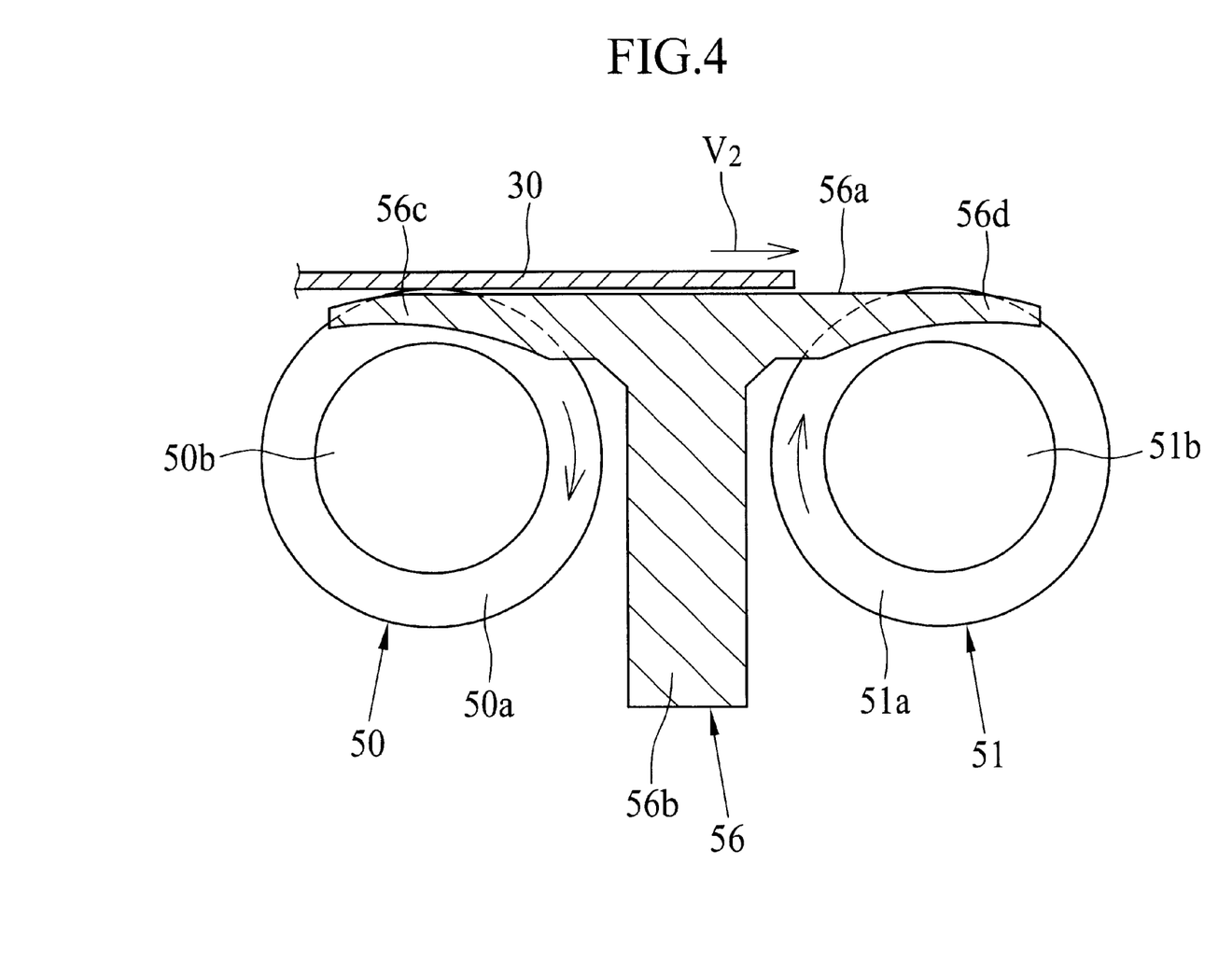
FIG. 4 is a sectional view of a capstan roller and a sheet guide.

Between the capstan rollers 50, 51 is provided a sheet guide 56, which has an T-shaped vertical section. The sheet guide has a flat guide plate 56a, and an attachment plate 56b that is extended below the guide plate 56a. As shown in FIG. 4, the sheet guide 56 is fixed at a position where the top surface of the guide plate 56a is slightly lower than the top of the capstan rollers 50, 51. In conveyance, the silicon rubber 50b, 51b of the capstan rollers 50, 51 are deformed to locate the recording sheet 30 approximately at the same level as the top surface of the guide plate 56a. Thus, the recording sheet 30 can be smoothly conveyed without being caught by the guide plate 56a.

A plurality of guide projections 56c, 56d are integrated with both lateral sides of the guide plate 56a, which has a comblike shape. These guide projections 56c, 56d are inserted into the orbital grooves 50c, 51c respectively, and are tapered off so as to fit the bottom surfaces of the orbital grooves 50c, 51c. Thereby, the recording sheet 30 is smoothly conveyed from the rear capstan roller 50 to the front capstan roller 51 by way of the guide plate 56a.

In FIG. 2, brackets 57, 58 retains the lateral ends of the pinch rollers 52, 53 in a rotatable manner. The brackets 57, 58 are slidable up and down by guide members (not shown). Tension springs 72, 73 (see FIG. 5) biases the brackets 57, 58 downward, to press the pinch rollers 52, 53 onto the capstan rollers 50, 51. The brackets 57, 58 have engaging holes 57a, 58a, into which guide pins 60a, 61aof drive levers 60, 61 are inserted.

The drive levers 60, 61 are intersected with each other, and are rotatable around an installation pin 62. Guide pins 60a, 61a are formed on one end portions of the drive levers 60, 61, and cam followers 63, 64 are attached to the other end portions of the drive levers 60, 61 in a rotatable manner. The cam followers 63, 64 come in contact with outer surfaces of an eccentric cam 65. When the eccentric cam 65 rotates, the cam followers 63, 64 are rotated. And the other end portions of the drive levers 60, 61 make rotational movement around the installation pins 62, by which the pinch rollers 52, 53 are moved between retract positions to be away from the recording sheet 30, and nip position to press the recording sheet 30 together with the capstan rollers 50, 51. Accordingly, the rotation of the eccentric cam 65 moves the pinch rollers 52, 53 to the retract positions selectively.

The brackets 57, 58, the drive levers 60, 61, the installation pin 62, the cam followers 63,64, and the eccentric cam 65 are provided in both end portions with respect to the main scan direction, as shown in FIG. 2.

As shown in FIGS. 5 to 8, the eccentric cam 65 is driven by a cam drive motor 66 through a motor driver (not shown). Rotation of the eccentric cam 75 is controlled by the controller 38, based on rotational speed data stored in the memory 39. When the cam drive motor 66 is activated, the eccentric cam 65 rotates about the pivot 67. Above the passage of the recording sheet 30 are disposed position sensors 70, 71, each of which is connected to the controller 38 and has a light emitter and a photo detector. The light emitter of the rear position sensor 70 emits detection light toward a position rear of the rear pinch roller 52, and the light emitter of the front position sensor 71 emits detection light toward a position between the pinch rollers 52, 53. The photo detectors detect the reflected detection light. When an intensity of the reflected detection light is changed, the controller detects the leading or trailing ends of the recording sheet 30 is passed below the position sensors 70, 71. A photo detector and a light emitter may be separated. In that case, one of the photo detector and the light emitter is positioned below the passage, and the other one is positioned above the passage.

When the recording sheet 30 is not conveyed, the eccentric cam 65 is retained at a position to depress the other end portions of the drive levers 60, 61 against the biases of the tension springs 72, 73, as shown in FIG. 5. Since the capstan rollers 52, 53 are away from the capstan rollers 50, 51, the silicon rubbers of the rollers 50 to 53 can be prevented from deformation.

Figure 6:
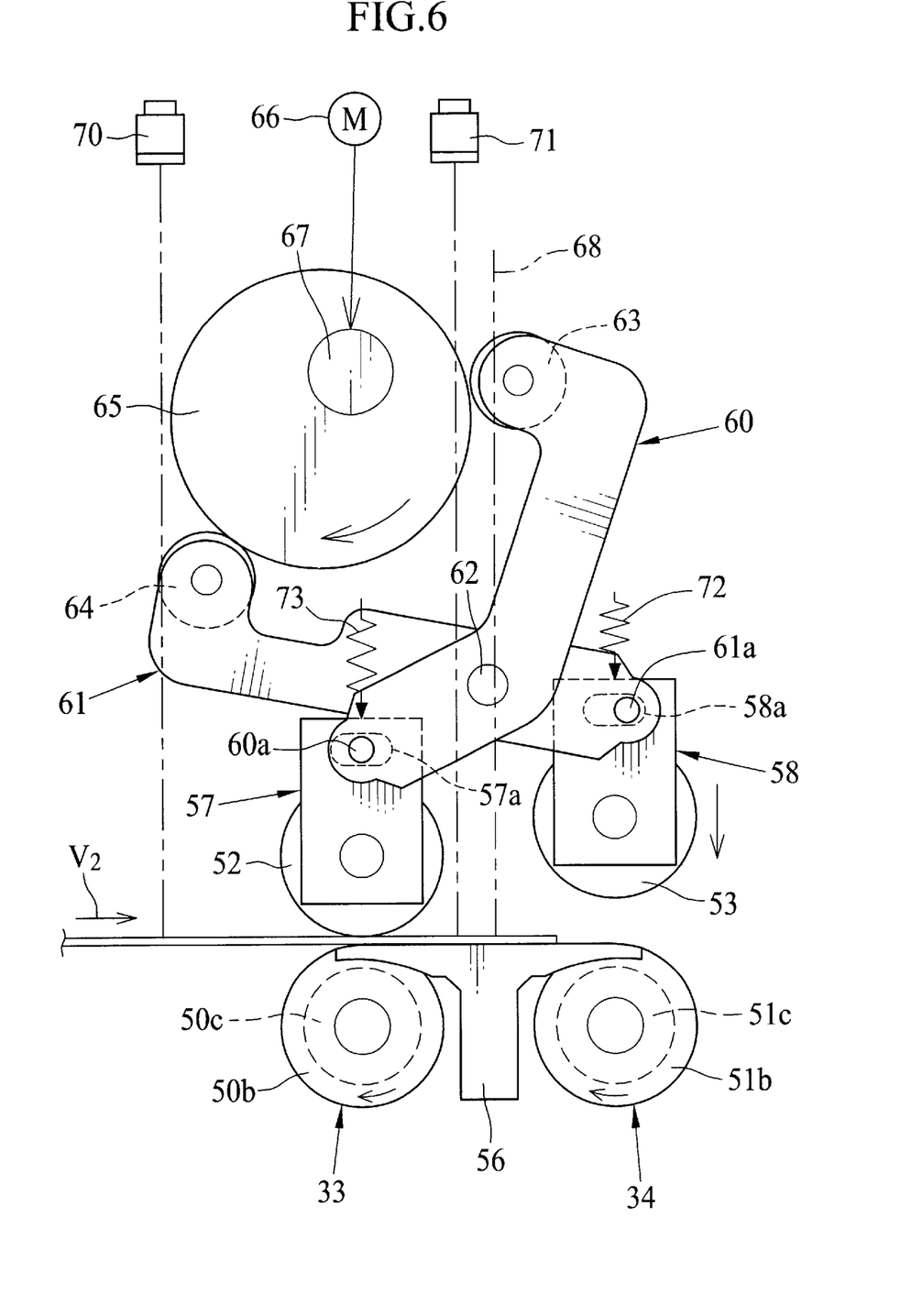
FIG. 6 is a side elevation view of the sheet feeding device in a state after an leading end of the recording sheet passes a rear position sensor.
Figure 7:
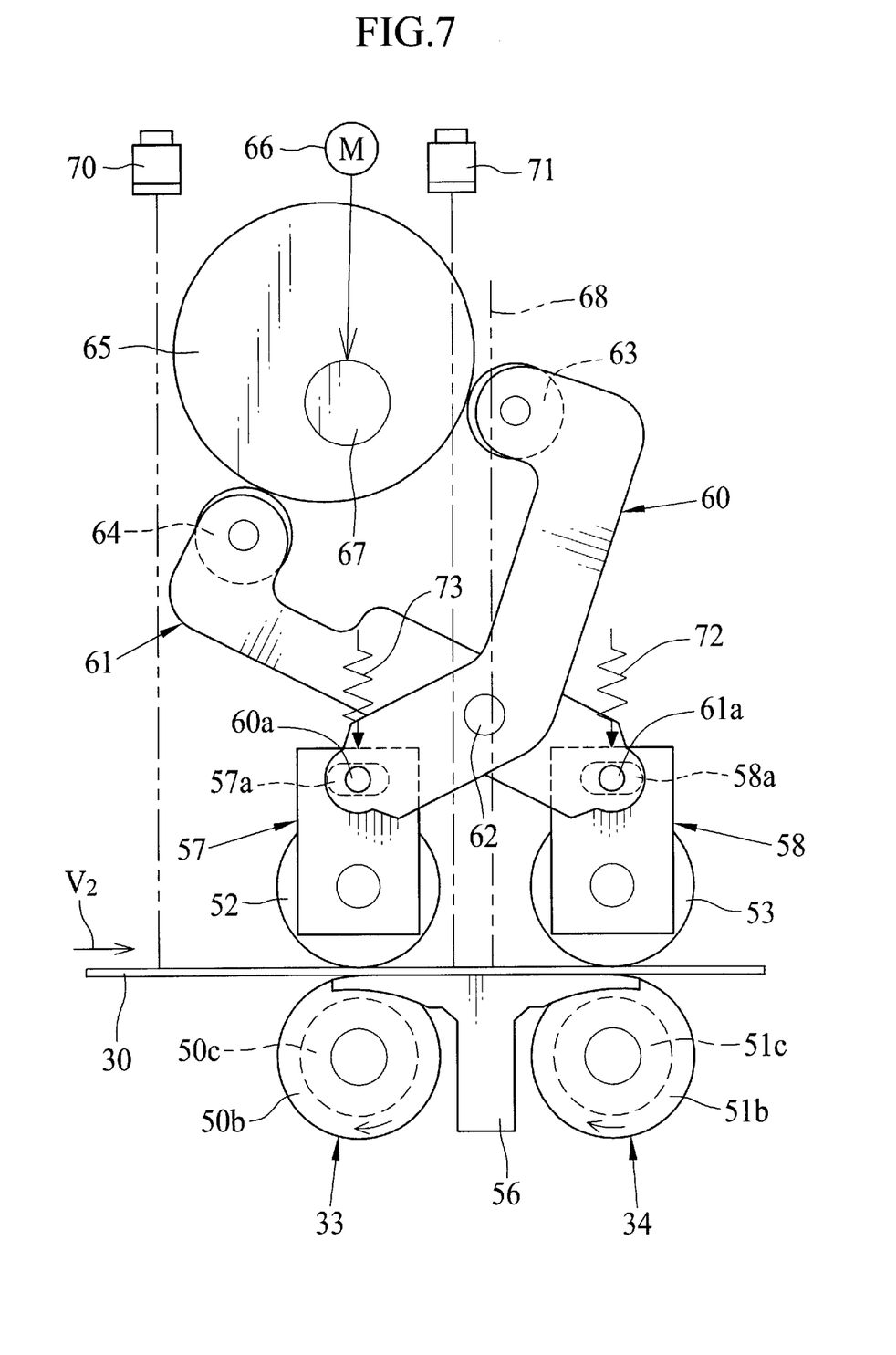
FIG. 7 is a side elevation view of the sheet feeding device in a state after the leading end of the recording sheet passes a second feeding roller pair.
Figure 8:
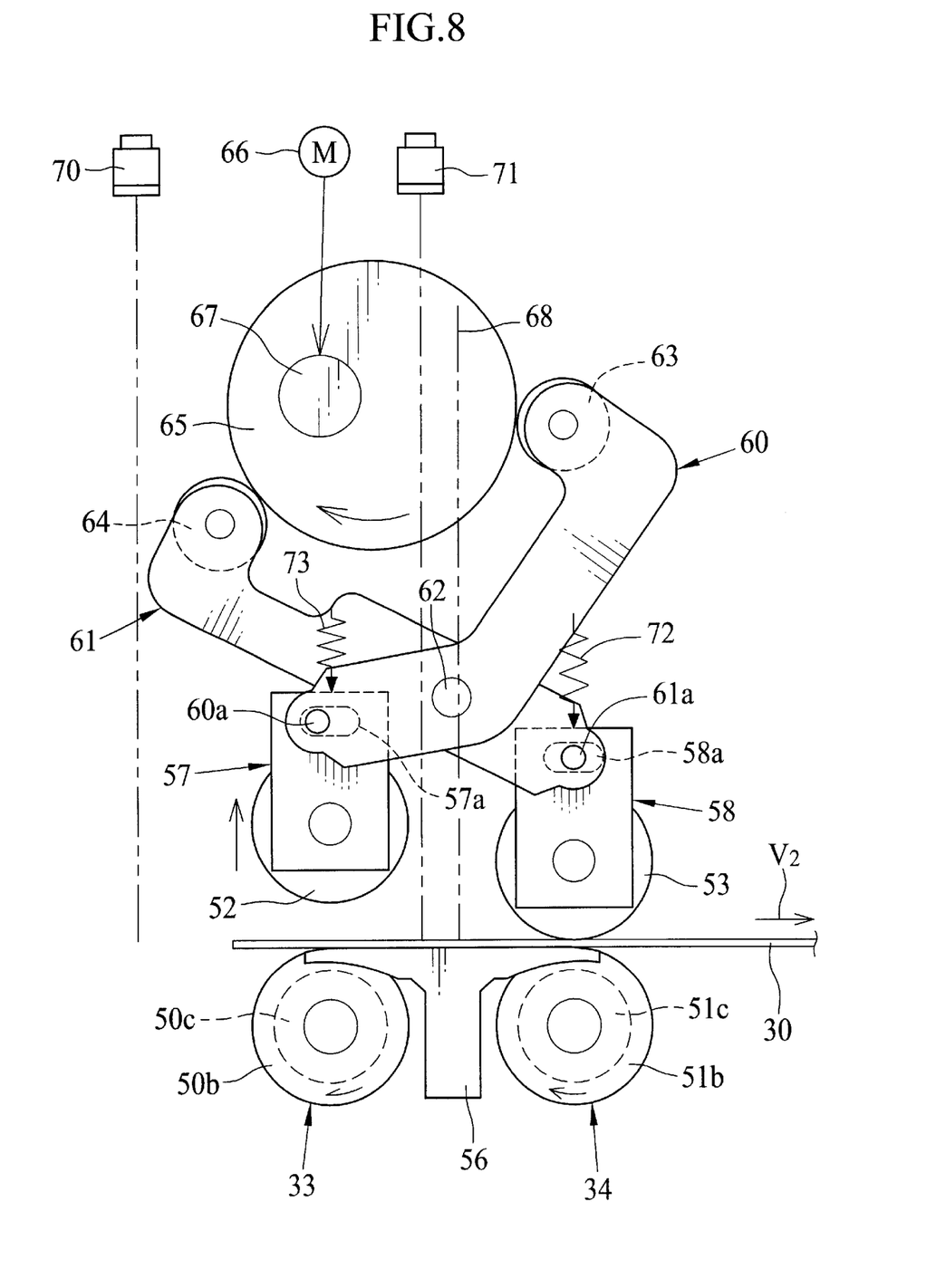
FIG. 8 is a side elevation view of the sheet feeding device in a state after the leading end passes a front position sensor.

When the recording sheet 30 is fed from the transfer roller pairs e35, 36, the controller 38 drives the cam drive motor 66 to rotate the eccentric cam 65 in the clockwise direction to a position shown in FIG. 6. The upstream drive lever 60 rotates in the counterclockwise direction, to move the upstream pinch roller 52 to the nip position. After nipping the recording sheet 30, the first feeding roller pair 33 feeds the recording sheet 30 in the sub-scan direction. When the leading edge of the recording sheet 30 passes the downstream position sensor 71, the controller 38 drives the cam drive motor 66 to rotate the eccentric cam 65 in the counterclockwise direction to a position shown in FIG. 7. Then, the downstream drive lever 61 rotates in the clockwise direction to move the downstream pinch roller 53 toward the nip position, whereas the upstream pinch roller 52 is kept at the nip position. The controller 38 rotates the eccentric cam 65 such that the downstream pinch roller 53 reaches the nip position after the leading end of the recording sheet 30 passes the second feeding roller pair 34. Since the recording sheet 30 is not thrust into the second feeding roller pair 34, it is possible to reduce the impact on the recording sheet 30 in passing through the second feeding roller pair 34.

The recording sheet 30 is fed by the first and second feeding roller pairs 33, 34 in a direction shown by an arrow (sub-scan direction) at the speed V2. When the trailing end of the recording sheet 30 passes the upstream position sensor 70, the controller 38 drives the cam drive motor 66 to rotate the eccentric cam 65 in the counterclockwise direction to a position shown in FIG. 8. The upstream drive lever 60 rotates in the clockwise direction to move the upstream pinch roller 52 upward toward the retract position, whereas the downstream pinch roller 53 is retained at the nip position. The controller 38 rotates the eccentric cams 65 such that the upstream pinch roller 52 is away from the recording sheet 30 before the trailing edge of the recording sheet 30 passes the first feeding roller pair 33.

The transfer roller pairs 35, 36 comprise capstan rollers 80, 81 below the guide plate 47, and pinch rollers 82, 83 above the guide plate 47. The capstan rollers 80, 81 are connected to a transfer motor 86 via secondary gears 84, 85 attached to one end portions thereof. The controller 38 drives the transfer motor 86 through a motor driver (not shown) based on feeding speed data stored in the memory 39. There are one-way clutches 87, 88 inside of the secondary gears 84, 85.

Figure 9:
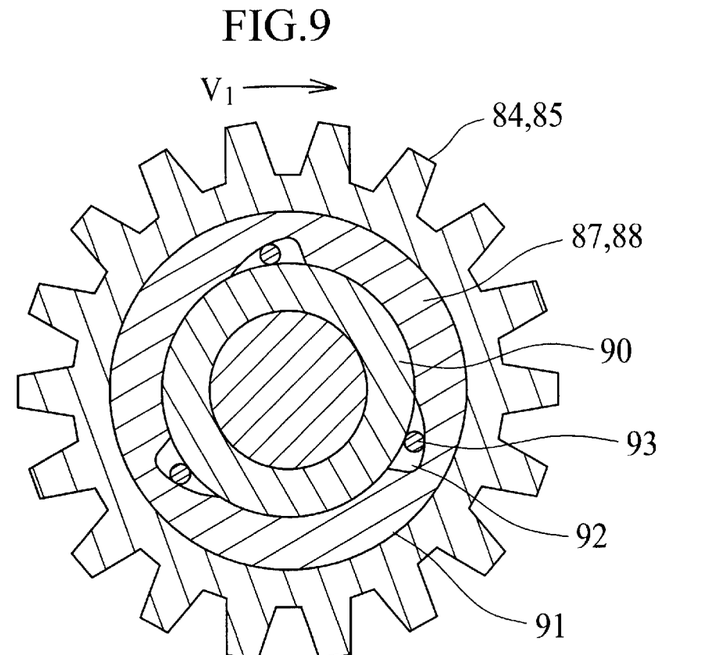
FIG. 9 is a schematic sectional view of a one-way clutch in an engaged state.

In FIG. 9, each of the one-way clutches 87, 88 includes an inner barrel 90, an outer barrel 91, engaging hollows 92, and engaging pins 93. Three engaging hollows 92 are formed in an inner wall of the outer barrel 91 symmetrically with respect to the direction of rotation about pivots of the one-way clutches 87, 88. Each of the engaging pins 93 is inserted into each of the engaging hollows 92. When the outer barrel 91 as well as the secondary gears 84, 85 revolve in the clockwise direction, the engaging pins 93 rotate inside of the corresponding engaging hollows 92. The engaging pins 93 comes in contact with the inner and outer barrels 90, 91, and fixed therebetween. Rotation of the outer barrel 91 is transmitted to the inner barrel 90 via the engaging pins 93, so the inner and outer barrels 90, 91 revolve together. Thereby, a driving power of the transfer motor 86 is transmitted to the capstan rollers 80, 81 via the one-way clutches 87, 88, to feed the recording sheet 30 at a speed V1. The controller 38 rotates the transfer roller pairs 35, 36 such that the maximum feeding speed of the transfer roller pairs 35, 36 including deviation is smaller than the feeding speed V2 of the feeding roller pairs 33, 34.

Figure 10:
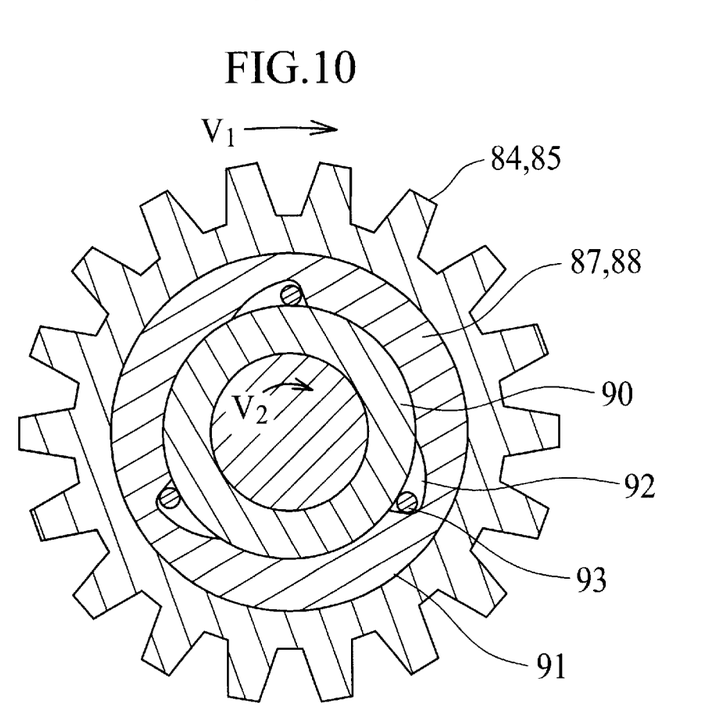
FIG. 10 is a schematic sectional view of the one-way clutch in an raced state.

When nipped by the first feeding roller pair 33, the recording sheet 30 is fed in the sub-scan direction at the speed V2. Then, as shown in FIG. 10, the outer barrel 91 rotates at the speed V1, whereas the inner barrel 90 rotates at the speed V2. Since the speed V1 is smaller than the speed V2, as mentioned above, the engaging pins 93 are disengaged from the outer barrel 91, by which the inner barrel 90 races inside of the outer barrel 91. Thereby, the capstan roller 80, 81 become free, and rotate at the same speed as the first feeding roller pair 33.

In FIG. 2, the recording sheet 30 is fed to the belt conveyor 37 from the second feeding roller pair 34. The belt conveyor 37 comprises a conveyor roller 37a and a conveyor belt 37b. The controller 38 drives a conveyor motor 94 to rotate the conveyor roller 37a. The conveyor belt 37b is bound around the conveyor roller 37a. When the conveyor roller 37a rotates, the conveyor belt 37b also rotates to feed the recording sheet thereon at a speed V3. The controller 38 rotates the conveyor roller 37a such that the minimum feeding speed of the belt conveyor 37, including deviation, is larger than the feeding speed V2 of the feeding roller pairs 33, 34. Feeding speed data of the belt conveyor 37 is stored in the memory 39, and read out by the controller 38.

While the tailing end portion of the recording sheet 30 is nipped by the second feeding roller pair 34, the recording sheet 30 is fed at the speed V2, slower than the feeding speed V3 of the belt conveyor 37. So the leading end portion of the recording sheet 30 is fed toward the processor section 12 with slipping. After the trailing end of the recording sheet 30 passes the second feeding roller pair 34, the recording sheet 30 is conveyed at the speed V3 by the belt conveyor 37.

Next, the operation of the above configuration will be described. When an print command is entered after powering the printer processor 10, the photosensitive recording paper 25 is drawn from the paper roll 26. The photosensitive recording paper 25 is cut by the paper cutter into the recording sheet 30, which is conveyed by plural conveyor roller pairs 31 toward the transfer roller pairs 35, 36. In the conveyance, the rear print device 15 records information on a rear surface of the recording sheet 30.

The recording sheet 30 is nipped by the transfer roller pairs 35, 36 and fed toward the first feeding roller pair 33. Since the feeding speed V2 of the feeding roller pairs 33, 34 is faster than the feeding speed V1 of the transfer roller pairs 35, 36, the one-way clutches 77, 78 are actuated to make the transfer roller pairs 35, 36 free, at the moment when the leading end of the recording sheet 30 is nipped by the first feeding roller pair 33. The load to the recording sheet 30 is not rapidly changed when the recording sheet 30 passes the first feeding roller pair 33, so it is possible to feed the recording sheet stably even when the feeding speed of the transfer roller pairs 35, 36 is deviated.

Afterward, the recording sheet 30 is fed by the first and second feeding roller pairs 33, 34. When a front end of an exposure area reaches the exposure position 68, the exposure device 32 is driven to project recording light beams to expose an image onto the exposure surface of the recording sheet 30 line by line. When the leading end of the recording sheet 30 passes the downward position sensor 71, the controller 63 drives the cam drive motor 66 to rotate the eccentric cam 65 in the clockwise direction. Then, the downward pinch roller 53 is moved toward the nip position. Under the control of the controller 38, the downward pinch roller 53 reaches the nip position after the leading end of the recording sheet 30 passes the second feeding roller pair 34. Since the impact on the recording sheet in passing the second feeding roller pair 34 is decreased, it is possible to prevent exposure unevenness caused by the deviation in feeding speed.

While being exposed, the recording sheet 30 is supported on the sheet guide 56 which is provided between the first and second feeding roller pairs 33, 34. Thus, the recording sheet is not bent downward during exposure, so it is possible to carry out exposure operation with higher accuracy in exposure positions.

When the tailing end of the recording sheet 30 passes the upstream position sensor 70, the controller 38 drives the cam drive motor 66 to rotate eccentric cam 65 in the clockwise direction. Then, the upstream pinch roller 52 is moved upward to retract from the recording sheet 30. Since the upstream pinch roller 52 is away from the recording sheet 30 before the trailing edge of the recording sheet 30 passes the first feeding roller pair 33, it is possible to decrease impact on the recording sheet 30 at the time when the trailing edge of the recording sheet 30 passes the first feeding roller pair 33. Thereby, exposure unevenness caused by impact on the recording sheet can be removed.

Thereafter, the recording sheet 30 is conveyed toward the processor section 12 by the belt conveyor 37. The feeding speed V3 of the belt conveyor 37 is set to be faster than the feeding speed V2 of the first and second feeding roller pairs 33, 34. Since the trailing end portion of the recording sheet 30 in nipped by the second feeding roller pair 34, the recording sheet 30 is conveyed at the speed V2 with the leading end portion thereof being slipped on the belt conveyor 37. There is no deviation in feeding speed, by which no exposure unevenness is occurred during transfer of the recording sheet 30.

In the above embodiment, the pinch rollers 52, 53 are moved up and down by the rotation of the eccentric cams 65, but two individual moving mechanisms may be provided to move the pinch rollers 52, 53. In the above embodiment, the recording sheet 30 is smoothly conveyed to the feeding roller pairs 33, 34 by racing the transfer roller pairs 35, 36, but it may be possible to provide a lifting mechanism for moving the pinch rollers 82, 83 of the transfer roller pairs 35, 36 up and down. In that case, the recording sheet 30 is fed to the first feeding roller pair 33 by moving the pinch rollers 82, 83 upward at the time when the leading end of the recording sheet 30 passes the first feeding roller pair 33. In addition, a roller conveyor, comprised of plural rollers to rotate at the same speed V3, may be substituted to the belt conveyor 37.

The speed of rotation of the eccentric cams 65 may be changed in accordance with the length of the recording sheet 30. If the recording sheet 30 is sufficiently long, the controller 38 can decrease the descendant speed of the downstream pinch roller 53, to reduce the impact on the recording sheet 30 at the time when the downstream pinch roller 53 comes in contact with the recording sheet 30. Thereby, it is possible to decrease deviation in feeding speed. Also the controller 38 can decrease the ascendant speed of the upstream pinch roller 54. In that case, it is possible to reduce the impact on the recording sheet 30 at the time when the upstream pinch roller 52 is away from the recording sheet 30. The pulse rates for driving the cam drive motor 66 may be stored in the memory 39 in accordance with the sheet length. The controller 38 can detect the sheet length and reads out the corresponding rotation speed data of the eccentric cam 65 from the memory 39.

Moreover, the feeding speed V2 of the feeding roller pairs 33, 34 may be changed according to the width and the thickness of the recording sheet 30. As the recording sheet 30 gets thicker or narrower, the pressure of the pinch rollers 52, 53 to the recording sheet 30 becomes larger, which makes the feeding speed faster. In order to prevent this, the controller 38 can decrease the feeding speed of the feeding roller pairs 33, 34, to keep the feeding speed at a predetermined value V2 regardless of the sheet type. The pulse rates for driving the feeding motor 54 may be stored in the memory 39 in accordance with the sheet type. The controller 38 may be detect the sheet type and reads out the corresponding pulse rate data from the memory 39.

The present invention is applicable to provide print devices other than the laser printer. For instance, an ink jet printer may be provided instead of the exposure device 32. In that case, because of no deviation in feeding speed of a recording sheet, recording ink dots from a ink-jet head are applied onto the recording sheet with high accuracy.

Thus, the present invention is not to be limited to the above embodiments, but on the contrary, various modifications are possible to those skilled in the art without departing from the scope of claims appended hereto.

What is claimed is:

1. A method for feeding a sheet-type recording material, said method comprising steps of:

feeding said recording material at a speed V1 by use of first feeding means;

transferring said recording material to second feeding means from said first feeding means, a feeding speed V2 of said second feeding means is faster than a maximum feeding speed of said first feeding means, to feed said recording material at the speed V2 during transfer, transferring said recording material to third feeding means from said second feeding means, said feeding speed V2 is slower than a minimum feeding speed of said third feeding means, to feed said recording material at a speed V2 during transfer; and feeding said recording material at a speed V3 by use of said third feeding means.

2. A method as defined in claim 1, wherein said second feeding means includes a first and second feeding roller pairs which rotate at a same speed, first feeding roller pair feeding said recording material to a recording position, and said second feeding roller pair feeding recorded said recording material toward said third feeding means.

3. A method as defined in claim 2, wherein said first and second feeding rollers are connected to each other by a steel belt.

4. A method as defined in claim 2, wherein said first feeding means includes at least one transfer roller pair which includes a one-way clutch, said one-way clutch is actuated to make said transfer roller pair free at the moment when the leading end of said recording material is nipped by said first feeding roller pair.

5. A method as defined in claim 4, wherein said third feeding means includes a belt conveyor or a roller conveyor, said recording material being fed with the leading end portion thereof being slipped on said belt conveyor or said roller conveyor before the trailing end of said recording material passes said second feeding roller pair.

6. A method as defined in claim 5, wherein said first roller pair releases said recording material before the trailing end of said recording material passes said first roller pair.

7. A method as defined in claim 5, wherein said second roller pair nips said recording material after the leading end of said recording material passes said second roller pair.

8. A method for feeding a sheet-type recording material, said method comprising steps of:

feeding said recording material at a speed V1 by use of at least one transfer roller pair;

transferring said recording material to a first feeding roller pair from said transfer roller pair, a feeding speed V2 of said first feeding roller pair is faster than a maximum feeding speed of said transfer roller pair, a one-way clutch of said transfer roller pair being actuated to make said transfer roller pair free at the moment when the leading end of said recording material is nipped by said first feeding roller pair, whereby said recording material is fed at the speed V2 during transfer; and feeding said recording material by use of said first and second feeding roller pairs, which are connected to each other by a steel belt and rotate at the same speed.

9. A method as defined in claim 8, further comprising steps of:

transferring said recording material to a belt conveyor from said second feeding roller pair, said feeding speed V2 is slower than a minimum feeding speed of said belt conveyor, the leading end portion thereof being slipped on said belt conveyor or said roller conveyor before the trailing end of said recording material passes said second feeding roller pair, whereby said recording material is fed at the speed V2 during transfer; and feeding said recording material at a speed V3 by use of said belt conveyor.

10. A device for feeding a sheet-type recording material along a passage having a recording position for recording an image onto said recording material line by line, said device comprising:

at least one transfer roller pair for feeding said recording material;

driving means for rotating said transfer roller pair;

a first feeding roller pair to feed said recording material sent from said transfer roller pair to said recording position, a feeding speed V of said first feeding roller pair is faster than a maximum feeding speed of said transfer roller pair;

a second feeding roller pair to feed recorded said recording material, said second feeding roller pair rotating at the same speed as said first feeding roller pair;

a one-way clutch provided with said transfer roller pair, said one-way clutch transmitting driving force of said driving means to said transfer roller pair, and said one-way clutch being actuated to make said transfer roller pair free at the moment when the leading end of said recording material is nipped by said first feeding roller pair; and a controller for controlling rotation of said transfer roller pair, said first and second feeding roller pairs, said controller rotates said transfer roller pair such that the feeding speed V of said first feeding roller pair is faster than a maximum feeding speed of said transfer roller pair.

11. A device as defined in claim 10, further comprising a belt conveyor for feeding said recording material transferred from said second feeding roller pair, said controller controlling said belt conveyor such that said feeding speed V is slower than a minimum feeding speed of said belt conveyor;

wherein said recording material is fed with the leading end portion thereof being slipped on said belt conveyor or said roller conveyor before the trailing end of said recording material passes said second feeding roller pair.

12. A device as defined in claim 11, wherein each of said first and second feeding roller pairs includes:

a capstan roller which is rotated under the control of said controller; and a pinch roller disposed in an opposite side to said capstan roller with respect to said passage, said pinch roller rotating subsidiary to the rotation of said capstan roller;

wherein said device includes a moving mechanism for moving said pinch rollers of said first and second feeding roller pairs between nip positions to press said recording material together with said capstan roller, and retract positions to retract from said recording material.

13. A device as defined in claim 12, further comprising a steel belt which is stretched between said capstan rollers of said first and second feeding roller pairs.

14. A device as defined in claim 12, wherein said controller moves said pinch roller of said first feeding roller pair toward said retract position before the trailing end of said recording material passes said first feeding roller pair.

15. A device as defined in claim 12, wherein said controller moves said pinch roller of said second feeding roller pair to said nip position after the leading end of said recording material passes said second feeding roller pair.

16. A device as defined in claim 12, wherein said pinch rollers of said first and second feeding roller pairs are retained at said retract positions before said recording material is fed from said transfer roller pair.

* * * * *